(12) United States Patent
Chang et al.

(10) Patent No.: US 7,356,362 B2
(45) Date of Patent: Apr. 8, 2008

(54) HEADSET STRUCTURE WITH BUILT-IN AUDIO SOURCE

(76) Inventors: Wen-Han Chang, 6F, No. 3, Lane 68, San Min Rd., Sung Shan District, Taipei City (TW); Chin-Ming Lu, 6F, No. 3, Lane 68, San Min Rd., Sung Shan District, Taipei City (TW)

( * ) Notice: Subject to any disclaimer, the term of this patent is extended or adjusted under 35 U.S.C. 154(b) by 495 days.

(21) Appl. No.: 11/148,282

(22) Filed: Jun. 9, 2005

(65) Prior Publication Data
US 2006/0281502 A1    Dec. 14, 2006

(51) Int. Cl.
*H04B 1/38* (2006.01)
(52) U.S. Cl. ............... 455/575.2; 455/575.8; 455/90.3; 455/557; 379/430; 381/74; 381/370; 381/372; 381/374; 381/381; 381/384
(58) Field of Classification Search ............ 455/575.2, 455/90.3, 569.2, 557; 379/430, 431; 381/74, 381/370, 383, 381, 375, 372
See application file for complete search history.

(56) References Cited

U.S. PATENT DOCUMENTS

| | | | |
|---|---|---|---|
| 5,457,751 A * | 10/1995 | Such ........................ 381/375 |
| 6,873,862 B2 * | 3/2005 | Reshefsky ................ 455/569.1 |
| 6,879,688 B2 * | 4/2005 | Winegar ..................... 379/430 |
| 6,888,950 B2 * | 5/2005 | Siskin et al. ................ 381/378 |
| 6,978,034 B2 * | 12/2005 | Lazzeroni et al. .......... 381/384 |
| 7,072,476 B2 * | 7/2006 | White et al. .................. 381/74 |
| 7,086,512 B2 * | 8/2006 | Shack et al. ............... 191/12.4 |
| 7,206,429 B1 * | 4/2007 | Vossler ....................... 381/381 |

* cited by examiner

*Primary Examiner*—Marceau Milord
(74) *Attorney, Agent, or Firm*—Leong C. Lei

(57) ABSTRACT

A headset having a built-in audio source and cable management mechanism is disclosed herein. The headset is composed of two loop-style earpieces and a cable connecting the two earpieces. One earpiece has a built-in audio source such as a MP3 player, an AM/FM receiver, and the like. The cable is for delivering audio signal from the audio source built in one earpiece to the other. The other earpiece has a built-in cable winder so that the cable could be pulled and fixed to a desired length. When the headset is not in use, a slight pull and release of the cable would allow the cable winder to retract the cable back into the earpiece.

2 Claims, 7 Drawing Sheets

HEADSET STRUCTURE WITH BUILT-IN AUDIO SOURCE

BACKGROUND OF THE INVENTION (a) Technical Field of the Invention

The present invention generally relates to audio headsets, and more particularly to an audio headset having built-in audio source and a retractable cable between the earpieces.

(b) Description of the Prior Art

Due to the recent widespread popularity of handheld consumer electronic devices such as mobile handsets and MP3 players, audio headset, a somewhat obscure technology, has regained the market focus. However, the major function of a headset remains to deliver audio signal from an external audio source to the ears of a user via a cable.

In other words, a traditional headset is simply a "passive" device. Without the external audio source, the headset is basically useless. The headset and the external audio source have traditionally been separate devices.

Every headset requires one or more cables for connecting to the external audio source and/or for connecting the earpieces. Headset cables are usually of some fixed length and they are quite often either too long or too short. Most people use some kind of cable tie to wrap and tie the cable into a bundle so as to control their length. This cable management makes the use of a headset quite troublesome.

Therefore, a cable winder is designed to solve the cable management problem. With the cable winder, the cable between the headset and the plug to the external audio source is wound and housed safely inside the cable winder when not in use. To use the headset and to extend the cable, the two ends of the cable are pulled until a desired length is reached and an internal mechanism stops the cable from being retracted back into the cable winder. The cable winder has been proven to be a very useful and convenient gadget to cable management.

However, currently there is no headset that combines the convenience of having a built-in audio source and a cable management solution both into a single device.

SUMMARY OF THE INVENTION

A headset having a built-in audio source and cable management mechanism is disclosed herein. The headset is composed of two loop-style earpieces, one for each ear of a user, and a cable connecting the two earpieces. Each of the loop-style earpieces has an ear loop for hanging the earpiece on the outer ear of the user and positioning the earpiece close to the ear.

One of the two earpieces has a built-in audio source and a chargeable battery both housed inside the body of the earpiece. The audio source could be a MP3 player, an AM/FM receiver, and the like. On the cover of the earpiece, there are a number of control buttons for controlling the function of the audio source, and a jack for battery charging. With the build-in audio source, the cable for connecting to the external audio source is omitted and the user is no longer required to be tied to an external audio source, giving the user a higher degree of mobility.

In the present invention, the cable between the two earpieces is for delivering audio signal from the audio source built in one earpiece to the other earpiece. For the earpiece that doesn't contain the audio source and the chargeable battery, it has a built-in cable winder so that the cable could be easily managed. With the cable winder, the cable could be pulled to a desired length and the length is maintained by the cable winder. When the headset is not in use, a slight pull and release of the cable would allow the cable winder, under the effect of an internal spring, to retract the cable back into the earpiece. The cable wider is designed such that, for every turn of the cable winder, the user has a chance to fix the cable length, thereby providing a multi-step length control capability to the cable.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
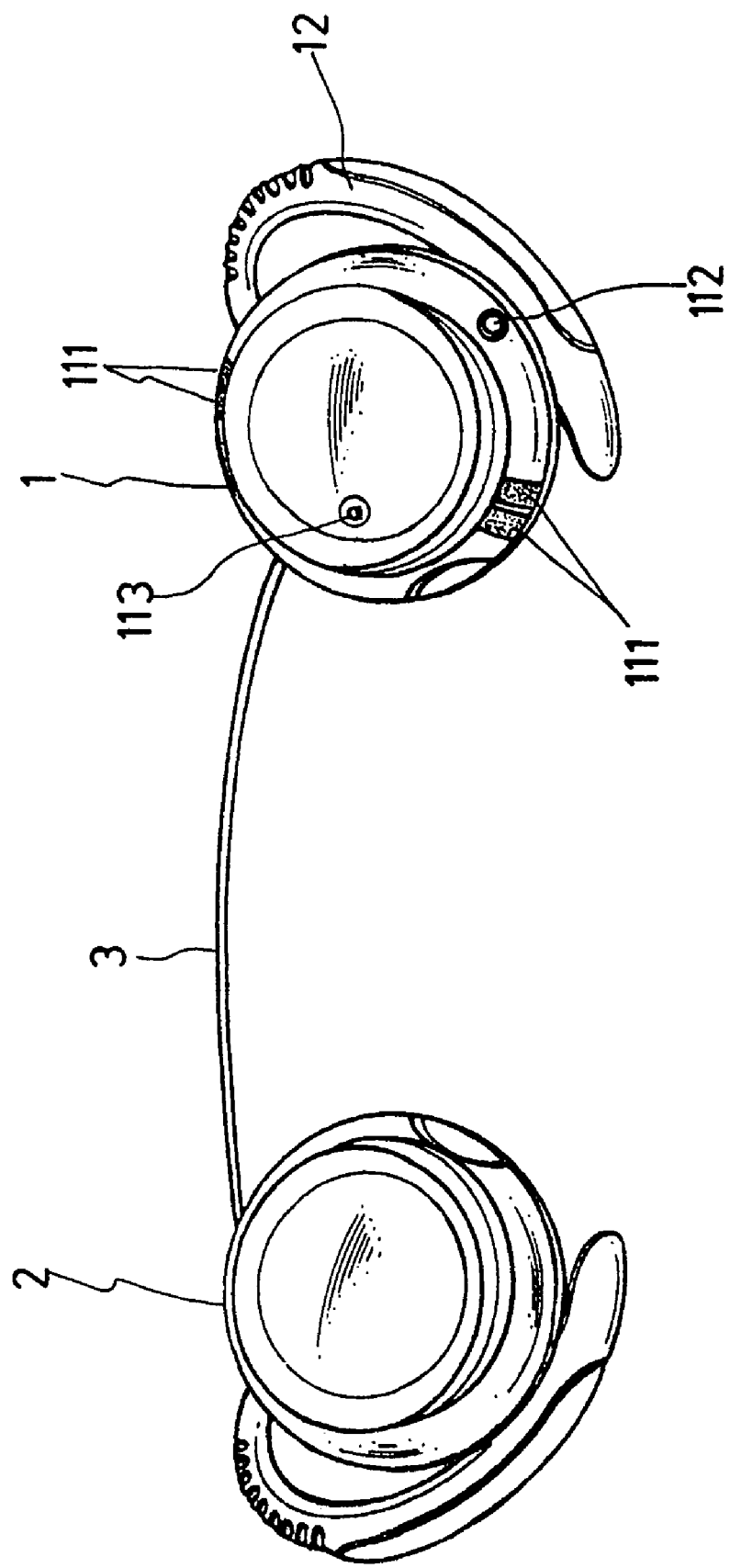
FIG. 1 is a perspective view showing the outlook of the headset according to an embodiment of the present invention.
Figure 3:
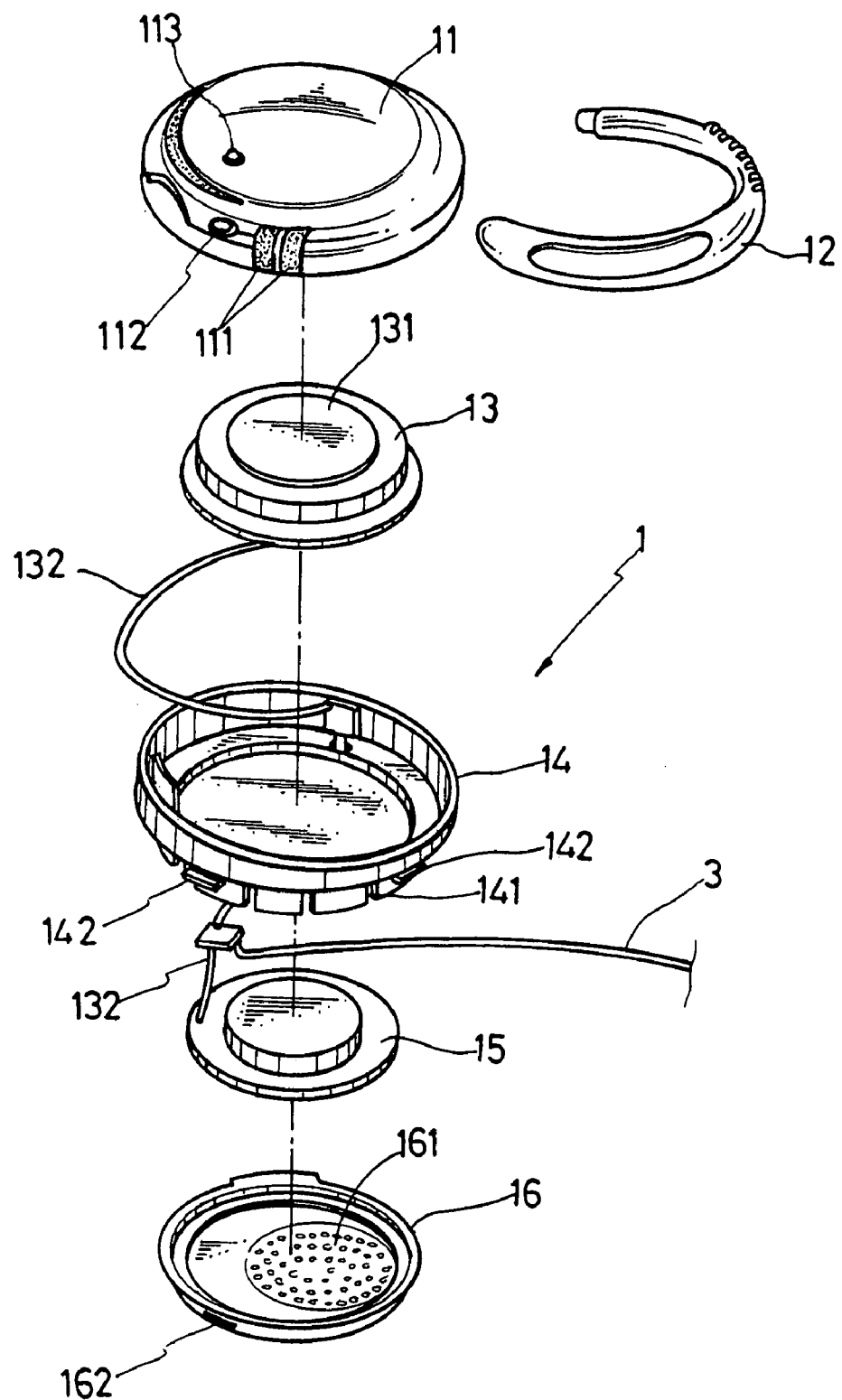
FIG. 3 is a perspective explosion view showing the internal of the earpiece having a built-in audio source according to an embodiment of the present invention.

As illustrated in FIG. 1, a headset 1 according to an embodiment of the present invention, which is based on the loop-styled headset, mainly contains two independent earpieces 1 and 2 connected by a cable 3. The earpiece 1, as shown in FIG. 3, is composed of an outer cover 11, an ear loop 12, an audio source member 13, a seat 14, a speaker 15, and an inner cover 16. Please note that the terms "outer" and "inner" are used herein based on the relative distance to the user's ear when the headset is worn. The outer cover 11 is locked to the seat 14 so as to house the audio source member 13 inside. The ear loop 12 is arranged to curve along the circular rim of the outer cover 11. There are a number control buttons 111 configured on the circular rim of the outer cover 11, providing various control functions such as power on/off, volume, start, stop, etc. to the audio source member 13.

Figure 4:
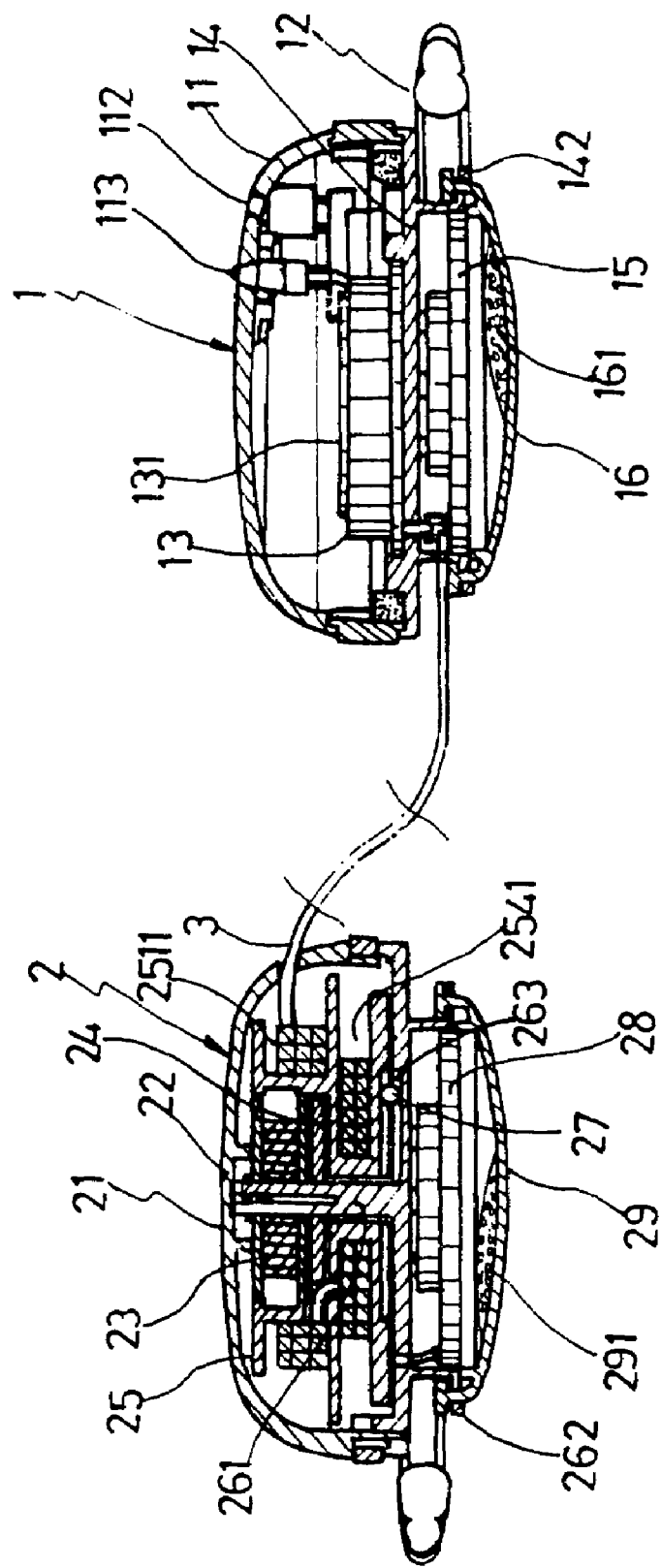
FIG. 4 is a sectional view of the earpieces of FIGS. 2 and 3.

Please also refer to FIG. 4. The audio source member 13 housed inside the space formed by the seat 14 and the outer cover 11 could be a MP3 player, an AM/FM receiver, or other types of device capable of playing audio information stored in its internal memory. A chargeable battery (such as a Lithium battery) 131 is arranged at a side of the audio source member 13. The chargeable battery 131 could be charged by connecting it to an external power source via an appropriate cable (not shown) and a jack 112 configured on the circular rim of the outer cover 11. A user could learn the amount of electricity left in the chargeable battery 131 via a power indicator 113 configured on the outer side of the outer cover 11. To load audio information into the audio source member 13, a user opens the outer cover 11 and connects the audio source member 13 to an external source for downloading audio information from the external audio source with appropriate connection interface and cabling.

The inner side of the seat 14 is configured with a number offence-like openings 141, through which an output signal wire 132 of the audio source member 13 is threaded to connect to the speaker 15. The signal wire 132 is extended by another signal wire (not numbered) which goes through the cable 3 to the speaker 28 (see FIG. 2) in the other earpiece 2 so as to deliver the audio signal from the audio source member 13 to the other earpiece 2.

In addition, there are a number of tenons 242 extending out of the circular rim of the seat 14 for locking into the corresponding grooves 162 configured along the circular rim of the inner cover 16, so that the seat 14 and the inner cover 16 could form a closed space to house the speaker 15 inside. On the inner side of inner cover 16, there is a grille 161 to facilitate the sound wave propagation from the speaker 15.

Figure 2:
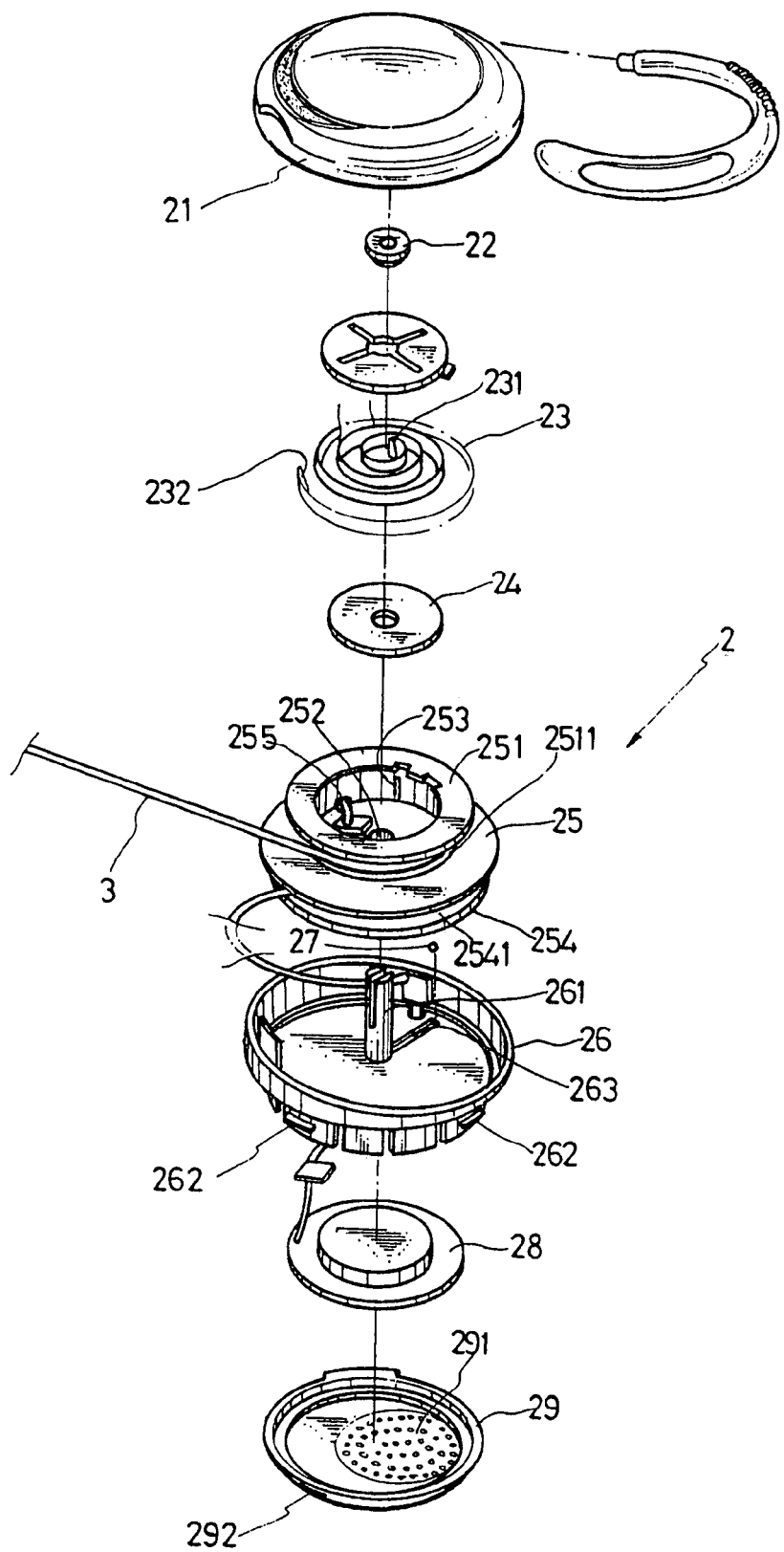
FIG. 2 is a perspective explosion view showing the internal of the earpiece having a built-in cable winder according to an embodiment of the present invention.

As shown in FIG. 2, the other earpiece 2 has the same outlook as the earpiece 1, which mainly contains an outer cover 21, an ear loop (not numbered), a patching cover 22, a swirled spring 23, a pad 24, a winder 25, a seat 26, a positioning ball 27, a speaker 28, and an inner cover 29. The swirled spring 23 is positioned inside the hollow space of the outer body 251 of the winder 25 and is interposed between the pad 24 and the patching cover 22. The center end 231 of the swirled spring 23 is fixedly attached to a groove configured on the axle 261 of the seat 26. The axle 261 threads the winder 25 via an axial hole 252, the pad 24, the swirled spring 23 together and joins to the patching cover 22. The other end 232 of the swirled spring 23 which is configured as a hook is fixedly locked to a groove 253 on the inside wall of the winder 25's outer body 251. In other words, the center end 231 and the hook end 232 are confined to the seat 26 and the winder 25 respectively. Therefore, when the winder 25 is rotated clockwise or counterclockwise, the swirled spring 23 is either tightened or loosened.

As shown in FIG. 2 and the left part of FIG. 4, the outer body 251 and the inner body 254 of the winder 25 have circular cable trays 2511 and 2541 respectively. The cable 3 is first wound around the outer cable tray 2511, and then, via a hole 255 configured on the inside wall of the upper body 251, wound around the inner cable tray 2541 in reverse direction, and finally connected to the speaker 28. The length of the cable 3 wound around the outer cable tray 2511 is equal to the length of the cable 3 wound around the inner cable tray 2541. In addition, the cable 3 wound around the inner cable tray 2541 wouldn't be extended into the outer tray 2511, and the cable 3 wound around the outer cable tray 2511 wouldn't be retracted into the inner cable tray 2541 either. When the cable 3 is pulled out of the earpiece 2, the cable 3 wound around the inner cable tray 2541 is loosened. When the cable 3 is released and the swirled spring 23 retracts the cable 3 back, the cable 3 wound around the inner cable tray 2541 is tightened again. Similar to the earpiece 1, there are a number of tenons 262 extending out of the circular rim of the seat 26 for locking into the corresponding grooves 292 configured along the circular rim of the inner cover 29, so that the seat 26 and the inner cover 29 could form a closed space to house the speaker 28 inside. On the inner side of inner cover 29, there is a grille 291 to facilitate the sound wave propagation from the speaker 28.

Figure 5:
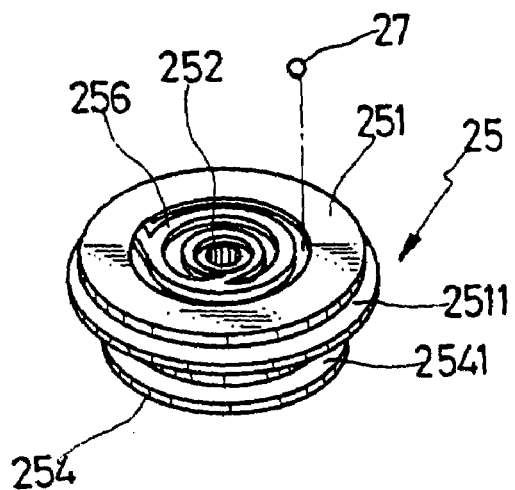
FIG. 5 is a perspective bottom view showing the roller of the cable winder of FIG. 2.
Figure 6:
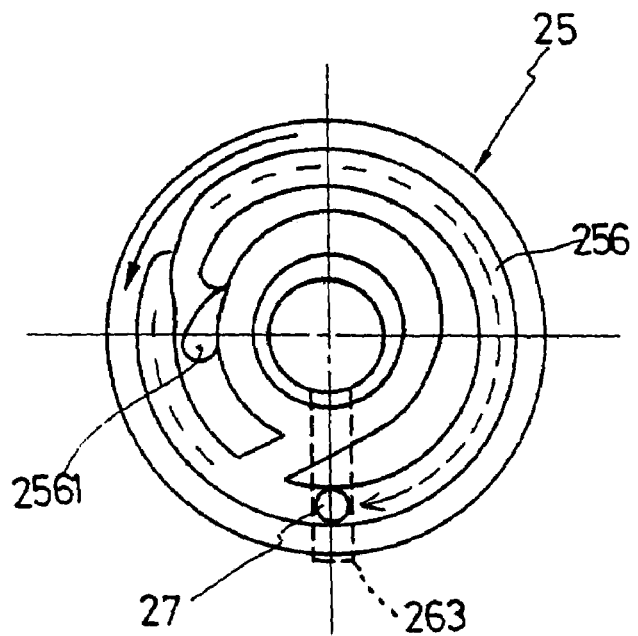
FIGS. 6~10 are schematic diagrams showing the consecutive stages of an operation scenario of the cable winder of FIG. 2.
Figure 7:
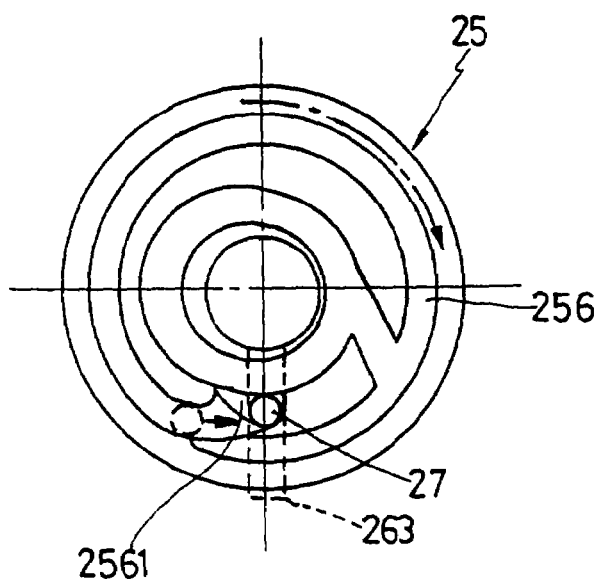
Figure 8:
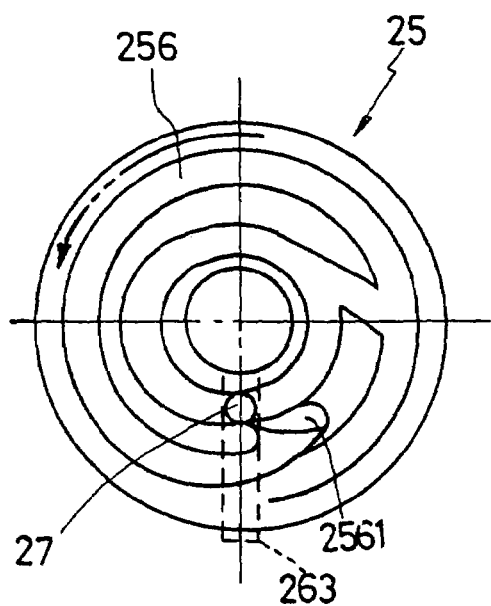
Figure 9:
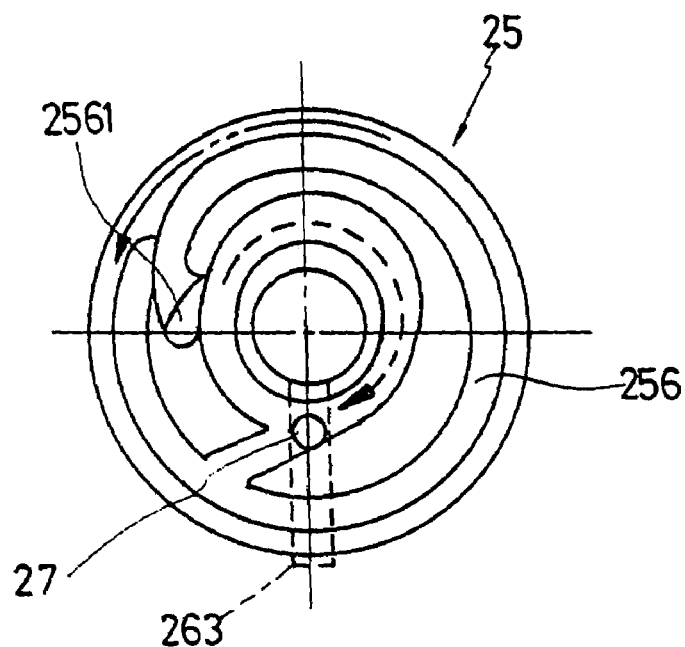
Figure 10:
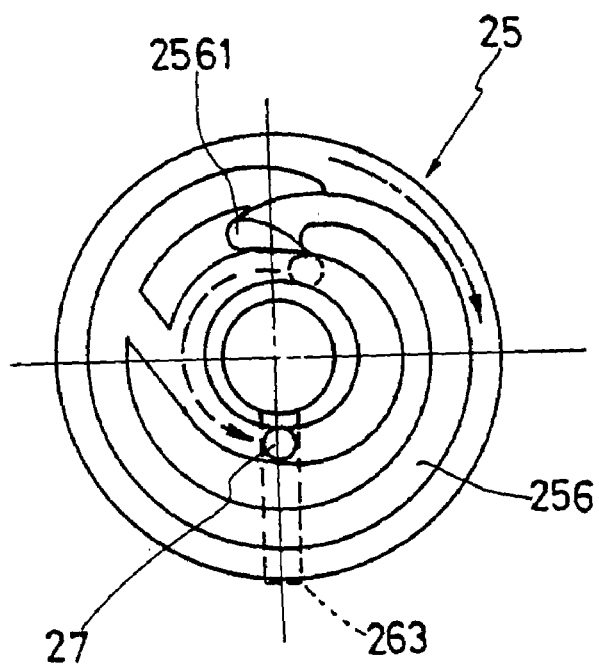

As shown in FIG. 5, which is a perspective bottom view of the winder 25, the bottom (or inner) side of the winder 25 has a ball alley 256. On the corresponding outer side of the seat 26, there is a positioning track 263 arranged in a radius direction where the positioning ball 27 is positioned. When the cable 3 is pulled or released, the positioning ball 27 and the ball alley 256 allow the winder 25 to be rotated smoothly. Because the orientation of the positioning track 263 is normal to the ball alley 256, the positioning ball 27 could only slide along the positioning track 263 toward or away from the center of the seat 26, as shown in FIGS. 6~10. In an appropriate location within the ball alley 256, there is a stopping element 2561. When the cable 3 is pulled, the positioning ball 27 would pass the stopping element 2561 without being stuck. When the cable 3 is extended up to the desired length and released, the swirled spring 23 would rewind the winder 25, and the positioning ball 27 would be rolled inside and stuck by the stopping element 2561, preventing the winder 25 from further spinning and retracting the cable 3. The desired length of cable 3 is thereby maintained. Therefore, the ball alley 256's shape along with the configuration of the stopping element 2561 provides a capability to extend cable 3 up to any desired length within its maximum reach. For every rotation of the winder 25, the positioning ball 27 would pass the stopping element 2561 once, meaning that it has a chance to be stuck by the stopping element for every turn of the winder 25. If the positioning ball 27 has passed the stopping element 2561, then it has to wait for another turn of the winder 25, in order to be stuck by the stopping element 2561. In other words, the present invention provides a multi-step positioning capability to the cable 3's extension.

To retract the extended cable 3, a user pulls the cable 3 again so as to roll the positioning ball 27 out of confinement of the stopping element 2561 and then releases the cable 3. Then, under the operation of the swirled spring 23, the winder 25 is rotated in the opposite direction and the cable 3 is rewound. Since the winder 25 is rotated now in a reverse direction, the positioning ball 27 wouldn't be stopped by the stopping element 2561 and the cable 3 could be retracted very quickly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An headset structure comprising a first earpieces, a second earpiece, and a cable connecting said first and second earpieces; wherein said first earpiece comprises an first outer cover, a first ear loop, an audio source member, a first seat, a first speaker, and a first inner cover; wherein said first outer cover is locked to said first seat, said first ear loop is arranged to curve along the circular rim of said first outer cover, at least a control button and a jack for battery charging are configured on the circular rim of said first outer cover;

said audio source member and a chargeable battery driving said audio source member are both housed inside the space formed by said first seat and said first outer cover, said chargeable battery is charged by an external power source via an appropriate cable and said jack, said audio source member is connected to said first speaker via a first signal wire threading through said first seat, said first signal wire is connected to a second signal wire of said cable to so as to deliver audio signal to said second earpiece;

said first seat has a plurality of openings on the inner side allowing said first signal wire to pass through, said first seat has a plurality of tenons extending out of the circular rim of said first seat for locking into a plurality of corresponding grooves of said first inner cover;

said first speaker is housed inside the space formed by said first seat and said first inner cover, and connected to said audio source member via said first signal wire; and said first inner cover has a grille on the inner side; said first inner cover has a plurality of grooves configured along the circular rim of said first inner cover for locking the corresponding said tenons of said first seat;

said second earpieces has the same outlook as said first earpiece and comprises a second outer cover, a second ear loop, a patching cover, a swirled spring, a pad, a winder, a second seat, a positioning ball, a second speaker, and a second inner cover; wherein said second outer cover is locked to said second seat, said second ear loop is arranged to curve along the circular rim of said second outer cover;

said patching cover seals said swirled spring inside an upper body of said winder;

said swirled spring is positioned inside the hollow space of said outer body of said winder and is interposed between said pad and said patching cover, a first end of said swirled spring is fixedly attached to a groove configured on an axle in the center of said second seat, a second end of said swirled spring is fixedly locked to a groove on the inside wall of said outer body;

said winder comprises an outer body and an inner body, each having a cable tray arranged along the rim of said outer body and said inner body, said winder has an axial hole allowing said axle of said second seat to penetrate through, the inside wall of said upper body has a groove for attaching an end of said swirled spring and a through hole allowing said cable to pass through from said outer cable tray to said inner cable tray, said winder has a ball alley configured on the inner side of said inner body;

said seat has an axle to thread said winder, said pad, and said swirled spring together and join to said patching cover, said seat has a positioning track arranged in a radius direction on the outer side of said second seat, said second seat has a plurality of openings on the inner side allowing said second signal wire of said cable to pass through, said second seat has a plurality of tenons extending out of the circular rim of said second seat for locking into a plurality of corresponding grooves of said second inner cover;

said positioning ball is positioned inside and slides along said positioning track caused by said ball alley when said winder is rotated, said positioning ball and said ball alley and said positioning track jointly form a length control mechanism for said cable;

said second speaker is housed inside the space formed by said second seat and said second inner cover, and connected to said audio source member via said second signal wire of said cable; and said second inner cover has a grille on the inner side; said second inner cover has a plurality of grooves configured along the circular rim of said second inner cover for locking said corresponding tenons of said second seat; and said cable connects said first and said second earpieces, said cable has a second signal wire inside, said cable inside said second earpiece is wound around said outer cable tray of said outer body of said winder in a first direction and, via said through hole of said outer body, wound around said inner cable tray of said inner body of said winder in a second direction opposite to said first direction.

2. The headset structure according to claim 1, wherein said ball alley has a stopping element at an appropriate location along said ball alley such that, for every turn of said winder, said stopping element is able to stuck said positioning ball to prevent said swirled spring to rewind said winder and retract said cable.

* * * * *